US009569801B1

(12) United States Patent
Xu

(10) Patent No.: US 9,569,801 B1
(45) Date of Patent: Feb. 14, 2017

(54) SYSTEM AND METHOD FOR UNITING USER ACCOUNTS ACROSS DIFFERENT PLATFORMS

(75) Inventor: Ziqiang Xu, Belmont, CA (US)

(73) Assignee: KABAM, INC., San Francisco, CA (US)

( * ) Notice: Subject to any disclaimer, the term of this patent is extended or adjusted under 35 U.S.C. 154(b) by 760 days.

(21) Appl. No.: 13/604,485

(22) Filed: Sep. 5, 2012

(51) Int. Cl.
*G06F 15/16* (2006.01)
*G06F 19/00* (2011.01)
*G06Q 50/00* (2012.01)

(52) U.S. Cl.
CPC .................................... *G06Q 50/01* (2013.01)

(58) Field of Classification Search
CPC ................................ G06Q 50/01; A63F 13/12
USPC ............................................ 709/204; 463/42
See application file for complete search history.

(56) References Cited

U.S. PATENT DOCUMENTS 6,951,516 B1 10/2005 Eguchi et al. .................. 463/40
7,056,217 B1 6/2006 Pelkey et al. ................... 463/43
7,522,058 B1 4/2009 Light
7,707,122 B2 4/2010 Hull
7,780,530 B2 8/2010 Ushiro et al. ................... 463/42
7,856,471 B2 * 12/2010 Pounds .............. G06Q 30/0251 370/338
7,970,712 B2 6/2011 Ruvolo
8,137,193 B1 3/2012 Kelly
8,137,194 B1 3/2012 Kelly
8,214,487 B2 7/2012 Savoor et al. ................ 709/224
8,257,174 B2 9/2012 Pincus
8,332,488 B1 * 12/2012 Dale et al. .................... 709/219
8,347,225 B2 1/2013 Blinnikka
8,347,322 B1 1/2013 Brown
8,353,760 B2 1/2013 Ocko
8,622,828 B1 1/2014 Harrington
8,663,004 B1 3/2014 Xu
8,734,243 B2 5/2014 Harrington
(Continued)

FOREIGN PATENT DOCUMENTS

CN 101635641 1/2010
CN 101715586 5/2010
(Continued)

OTHER PUBLICATIONS

Johnson, Ken, VSCpr for GREE, Inc. "GREE Gaming Platform Provides Global User Base for All Developers. New Platform Offers Unified Social Gaming System", Burlingame, CA, PRWeb, Dec. 5, 2011, 2 pages.
(Continued)

*Primary Examiner* — Philip Chea
*Assistant Examiner* — Wing Ma
(74) *Attorney, Agent, or Firm* — Sheppard Mullin Richter & Hampton LLP

(57) ABSTRACT

Individual users may log into the same online game from multiple different social networking platforms. The disclosed technology provides a way to unite users' accounts such that users that have logged into the online game from different social networking platforms can have their progress in the online game preserved regardless of which social networking platforms the user logged in from. Business intelligence about differences in the user's value when logging in from the different social networking platforms can be determined and incentivizing actions can be performed on the social networking platforms based on the business intelligence.

11 Claims, 7 Drawing Sheets

(56) References Cited

U.S. PATENT DOCUMENTS 8,843,557 B2 9/2014 Ranade
8,868,655 B2 10/2014 Ranade
8,881,181 B1 11/2014 Harrington
8,984,541 B1 * 3/2015 Brown .................... G06F 9/541 705/319
8,986,116 B1 3/2015 Harrington
9,011,242 B2 4/2015 Xu
9,116,732 B1 8/2015 Harrington
9,223,599 B1 * 12/2015 Racanelli ............ G06F 9/45512
2003/0078960 A1 4/2003 Murren
2003/0177187 A1 * 9/2003 Levine .................... A63F 13/10 709/205
2004/0117386 A1 6/2004 Lavender
2005/0245317 A1 11/2005 Arthur
2005/0272504 A1 12/2005 Eguchi
2006/0121986 A1 6/2006 Pelkey et al. ................... 463/40
2006/0287099 A1 * 12/2006 Shaw ...................... A63F 13/12 463/42
2007/0150603 A1 6/2007 Crull
2007/0173324 A1 7/2007 Multerer
2007/0233736 A1 10/2007 Xiong
2007/0274460 A1 11/2007 Shaffer
2008/0119277 A1 5/2008 Thelen
2008/0134035 A1 6/2008 Pennington
2008/0187143 A1 8/2008 Mak-Fan
2009/0034696 A1 2/2009 Ramanathan
2009/0112989 A1 4/2009 Anderson
2009/0144075 A1 6/2009 Flinn
2009/0172795 A1 7/2009 Ritari
2009/0197681 A1 8/2009 Krishnamoorthy
2009/0197881 A1 8/2009 Kugimiya
2009/0199275 A1 * 8/2009 Brock et al. ...................... 726/4
2009/0292814 A1 * 11/2009 Ting et al. .................... 709/229
2009/0325712 A1 12/2009 Rance ............................ 463/42
2009/0327232 A1 12/2009 Carter
2009/0327427 A1 12/2009 Mathew
2009/0327882 A1 12/2009 Velusamy
2010/0024015 A1 1/2010 Hardt
2010/0063969 A1 3/2010 Kasargod
2010/0106782 A1 4/2010 Huang et al. ................. 709/206
2010/0146118 A1 6/2010 Wie
2010/0169798 A1 7/2010 Hyndman
2010/0197409 A1 8/2010 Van Luchene .................. 463/42
2010/0216553 A1 8/2010 Chudley
2010/0228617 A1 9/2010 Ransom
2010/0229106 A1 * 9/2010 Lee et al. ...................... 715/757
2010/0235754 A1 9/2010 Leitheiser
2010/0274815 A1 * 10/2010 Vanasco ............ G06F 17/30867 707/798
2010/0304862 A1 12/2010 Coleman et al. ............... 463/32
2010/0312820 A1 12/2010 Goffinet
2011/0014972 A1 1/2011 Herrmann et al. ............. 463/25
2011/0016488 A1 1/2011 Athias
2011/0022450 A1 1/2011 Meredith
2011/0023101 A1 * 1/2011 Vernal et al. ..................... 726/7
2011/0107239 A1 5/2011 Adoni
2011/0131508 A1 6/2011 Gershfang
2011/0151976 A1 6/2011 Holloway et al. .............. 463/42
2011/0179161 A1 * 7/2011 Guy et al. ..................... 709/224
2011/0202605 A1 8/2011 Shochet
2011/0212783 A1 9/2011 Dale
2011/0224000 A1 * 9/2011 Toga ..................... A63F 13/424 463/42
2011/0237335 A1 9/2011 Holloway
2011/0238608 A1 9/2011 Sathish
2011/0250949 A1 10/2011 Van Os
2011/0251970 A1 * 10/2011 Oien et al. .................... 705/319
2011/0269548 A1 11/2011 Barclay
2011/0295626 A1 12/2011 Chen
2012/0015739 A1 1/2012 Craine
2012/0047008 A1 2/2012 Alhadeff
2012/0054646 A1 3/2012 Hoomani
2012/0060103 A1 * 3/2012 Arasaki ................. G06F 3/0481 715/752
2012/0077523 A1 3/2012 Roumeliotis et al. ..... 455/456.3
2012/0094766 A1 * 4/2012 Reynolds ................ A63F 13/12 463/42
2012/0124147 A1 5/2012 Hamlin
2012/0142429 A1 6/2012 Muller
2012/0202587 A1 * 8/2012 Allen et al. ..................... 463/25
2012/0227086 A1 * 9/2012 Dale et al. ........................ 726/3
2012/0227087 A1 * 9/2012 Brown et al. ..................... 726/3
2012/0244948 A1 * 9/2012 Dhillon ................... A63F 13/10 463/42
2012/0252579 A1 10/2012 Sethi
2012/0254903 A1 * 10/2012 Brown et al. ................. 719/328
2012/0290949 A1 11/2012 Elenzil
2012/0290950 A1 * 11/2012 Rapaport ................ H04L 51/32 715/753
2012/0324001 A1 12/2012 Leacock
2013/0005476 A1 1/2013 Keswani
2013/0006736 A1 * 1/2013 Bethke .................... A63F 13/12 705/14.12
2013/0014033 A1 1/2013 Hamick
2013/0031171 A1 * 1/2013 Serena ................... G06Q 50/01 709/204
2013/0073400 A1 * 3/2013 Heath .................... G06Q 30/02 705/14.73
2013/0090170 A1 * 4/2013 Reed ............................... 463/42
2013/0091204 A1 * 4/2013 Loh ....................... H04L 65/403 709/204
2013/0091221 A1 4/2013 Bennett
2013/0143669 A1 6/2013 Muller
2013/0151603 A1 * 6/2013 Lobb ....................... A63F 13/12 709/204
2013/0151604 A1 6/2013 Ranade
2013/0159430 A1 6/2013 Ranade
2013/0165234 A1 * 6/2013 Hall et al. ....................... 463/42
2013/0172085 A1 7/2013 Harrington
2013/0198275 A1 * 8/2013 Forsblom ............... G06Q 50/01 709/204
2013/0212191 A1 * 8/2013 Suraj ....................... H04L 51/32 709/206
2013/0282828 A1 10/2013 Lawler
2013/0326368 A1 * 12/2013 Voas ...................... G06Q 50/01 715/753
2013/0332825 A1 * 12/2013 Singh ..................... G06Q 10/10 715/273
2014/0179434 A1 6/2014 Xu
2014/0187333 A1 7/2014 Craine

FOREIGN PATENT DOCUMENTS

CN 102185789 9/2011
EP 2383683 A1 11/2011
WO 2008144412 1/2008
WO 2010025343 1/2010
WO 2013086268 6/2013
WO 2013086268 A1 6/2013
WO 2013096261 6/2013
WO 2013096261 A1 6/2013
WO 2013103655 7/2013
WO 2013103655 A1 7/2013

OTHER PUBLICATIONS

"Buddy Rush:: The World's Best Cross-platform RPG!", http://buddyrush.sollmo.com/, printed Nov. 28, 2011, copyright 2011 by Team Sollmo with Company 11, Inc., 2 pages.

"FriendFeed", definition from Wikipedia, the free encyclopedia, printed Nov. 28, 2011, 3 pages.

Hendrickson, Mark, "Watch Out FriendFeed: Socialthing! Is Even Easier to Use", http://techcrunch.com/2008/03/10/watch-out-friendfeed-socialthing-is-even-easier-to-use/, posted Mar. 10, 2008, 4 pages.

Hendrickson, Mark, "Watch Out FriendFeed: Socialthing! is Even Easier to Use", http://techcrunch.com/2008/03/10/watch-out-friendfeed-socialthing-is-even-easier-to-use/, posted Mar. 10, 2008, printed Nov. 28, 2011, 2 pages.

(56) References Cited

OTHER PUBLICATIONS

Webster, Andrew, "Social games need to become truly cross-platform", http://www.gamezebo.com/news/2011/06/08/social-games-need-become-truly-cross-platform, posted Jun. 8, 2011, printed Nov. 28, 2011, 2 pages.

* cited by examiner

SYSTEM AND METHOD FOR UNITING USER ACCOUNTS ACROSS DIFFERENT PLATFORMS

FIELD

The disclosure relates to an online game where individual users may log into the online game from multiple different social networking platforms. The disclosure provides users that have logged into the online game from different social networking platforms can have their progress in the online game preserved regardless of which social networking platforms the user previously logged in from. Business intelligence about the social networking platforms can be determined from the users' participation in the online game via the different social networking platforms.

BACKGROUND

Social online games are known. Typically, users log into a social online game from a social networking platform, e.g., Facebook, Google+, and the like. The gaming experience within the online game may be tied into the social networking platform. For example, the user interface of the online game may be presented within the user interface for the social networking platform, notifications of the activity of a user may be sent back to the social networking platform for presentation, other users that are linked to the user may be recommended for cooperation in the online game, and/or other features may be tied to the social networking platform.

Generally, if an online game is provided for different social networking platforms, then the online game is provided separately to each of the different social networking platforms. As such, in order for a user to participate in the online game from two different social networking platforms, the user often have two separate user accounts for the online game (e.g., one for each social networking platform). If users log into the online game from different social networking platforms, the typically may not be able to participate in the game with each other, and may be restricted to participation with other users that have logged in through the same social networking platform. Furthermore, if the user logs into the online game from one social networking platform, and later the user logs into the online game from a second social networking platform, the user's progress in the online game may not be accurately reflected when the user is logged in from the second social networking platform. Additionally, the provider of the online game may not fully determine the value of the user because the business intelligence about that user—how the user spends his time in and money on the game—is spread over multiple accounts from multiple social networking platforms.

SUMMARY

One aspect of the disclosure relates to a system and method for uniting a user account for an online game across two or more social networking platforms, e.g., a first social networking platform and a second social networking platform. This typically includes enabling an individual user to log into the online game, which may take place in a virtual space, through two or more of different social networking platforms, thereby extending the accessibility of the online game with respect to the individual user. The disclosed technology may reduce or eliminate the user logging into the online game from two different social networking platforms to have two different user accounts for the online game. The disclosed technology may unite these accounts and may, among other things, provide the user with the ability to play the game as if there were one account, e.g., every time the user logs into the game, he may be presented with an up-to-date version of his account, regardless if the user is logging in (or last logged in) from one social network or another. Once the accounts are united, business intelligence can be implemented to assist the provider of the online game with measureable metrics for the individual user across the various social networking platforms. This may enable the provider to determine and/or target user/social networking platform combinations that have relatively high values, to identify relative value of different users on an individual social networking platform, and/or perform other analysis.

A system for uniting a user account across a first social networking platform and a second social networking platform for an online game may include one or more servers. The server may be configured to execute computer modules. The computer modules may include one or more of a user account module, a federation module, a social network information module, a notification module, a space module, a business intelligence module, and/or other modules.

The user account module may be configured to manage user accounts associated with individual users. The user accounts may include a first user account associated with a first user. The first user account may include user information associated with the first user. For example, the first user account may include a global user identifier configured to represent the first user across multiple (e.g., a first and a second) social networking platforms and in the online game. The user information associated with the first user may include network abstraction identifiers configured to represent the first user within individual social networking platforms. The network abstraction identifiers may include a first network abstraction identifier, a second network abstraction identifier, and/or other network abstraction identifiers. The first network abstraction identifier may be configured to represent the first user within the first social networking platform, regardless of any particular games offered through that social networking platform. The second network abstraction identifier may be configured to represent the first user within a second social networking platform, again, regardless of any particular game offered through that social networking platform. The user information may include a first game user identifier configured to represent the online game and the first user within the online game. Other user information is contemplated.

The federation module may be configured to use one or more of the global user identifier, an appropriate one of the first network abstraction identifiers, the first game user identifier, and/or other user information to identify that the first user across different social networking platforms. In some implementations, the user may be assigned a network abstraction identifier for each social networking platform that the user uses to access the online game. The user also, in some instances, may be assigned a game identifier (associated with the game) an in-game user identifier (a user within the game) for each log in. This means that the user may have multiple in-game user identifiers for the same game identifier, each game identifier and in-game user identifier being associated with a different network abstraction identifier (one for each social networking platform that the user uses to access the online game). Then, responsive to a request by the first user to play the online game on a second social networking platform, the federation module may examine the in-game user identifiers, the game identifiers, and the network abstraction identifiers associated with the first user and may identify the user as the same user that played the online game on the first social networking platform.

In implementations with a space module, the space module may be configured to instantiate a virtual space of the game. The state of the virtual space may be dependent on the last game session played by the first user. Based on the identification of the first user by the federation module, the state of the virtual space may be dependent on the last game session played by the first user, even if the last game was accessed the second social networking platform.

The business intelligence module may be configured to analyze the first user's activity within an online game session and compare that activity to activity from another game session on the same social networking platform. For example, information related to activity of the first user in an online game session (e.g., revenue generated, virtual currency bought or sold, time logged into the game, time logged into a social networking platform, number of friends or associates on a social networking platform, average revenue per user, lifetime value, average number of games played and/or other information) where the first user accessed the online game via one social networking platform may be analyzed and/or compared with similar information related to activities of the first user during game sessions where the first user accessed the game via the second social networking platform.

The social network information module may be configured to aggregate social networking information for the individual users that is received from the different social networking platforms. For example, for the first and second social networking platforms, social networking information about the first user that is received from the first social networking platform or received the second social networking platform may be aggregated to represent the first user across both social networking platforms.

In one aspect of the disclosed technology there is a computer-implemented method of uniting user accounts across a first social networking platform and a second social networking platform for an online game. The method includes storing and/or retrieving a global user identifier configured to represent a first user in response to receiving a request from the first user to play the online game via the first social networking platform. Additionally, a game identifier configured to represent the first user's play of the online game via the first social networking platform is stored and/or retrieved. A network abstraction identifier configured to represent the first user being a member of the first social networking platform is also stored and/or retrieved such that, responsive to a request by the first user to play the online game via a second social networking platform, the first user may be identified as the same user that played the online game via the first social networking platform.

In one aspect of the disclosed technology, there is a computer-implemented method for resolving user accounts across multiple social networking platforms for an online game. The method involves receiving a request from a first user to play the online game via a first social networking platform. A network abstraction identifier is requested for the first user from an account platform, where the network abstraction identifier represents that the first user has played the online game via a second social networking platform. The online game is then presented to the first user via the first social networking platform such that the online game reflects the first user's play of the online game via the second social networking platform.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
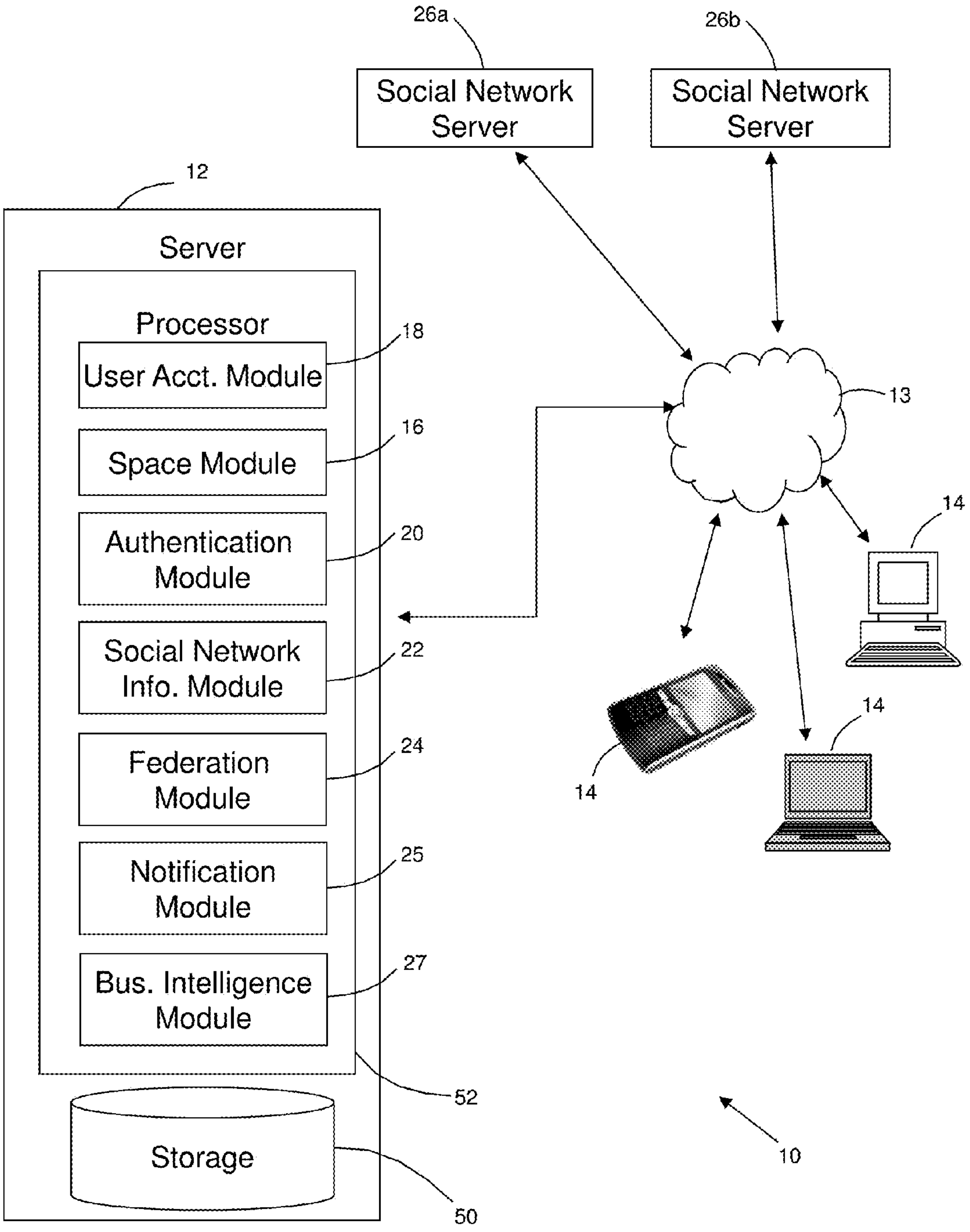
FIG. 1 illustrates a system configured to unite user accounts across social networking platforms for an online game.

FIG. 1 illustrates a system 10 configured to facilitate play of an online game by users through a plurality of social networking platforms. System 10 may enable users logging into the game from different social networking platforms to play with each other in the online game. System 10 may enable an individual user to log into the same user account for the game from any of a plurality of different social networking platforms. In some implementations, system 10 may include a server 12. Server 12 may be configured to communicate via one or more electronic communication links with one or more client computing platforms 14 and/or social networking server 26*a*, 26*b* according to a client/server architecture communicated over a network 13, e.g., the Internet, wide area network (WAN), local area network (LAN), or the like. The users may access system 10 and/or the online game via client computing platforms 14.

Server 12 may be configured to execute one or more computer program modules. The one or more computer program modules may include one or more of a space module 16, a user account module 18, an authentication module 20, a social network information module 22, a federation module 24, a notification module 25, a business intelligence module 27, and/or other modules.

Space module 16 may be configured to host a virtual space for access by users via client computing platforms 14. The users may participate in the online game within the virtual space. Hosting the virtual space may include executing an instance of the virtual space, and implementing the instance of the virtual space to determine view information representing views of the virtual space. The view information may then be communicated from server 12 to client computing platforms 14 to facilitate presentation of the views to the users. The views may be presented to the users within user interfaces of applications being executed on client computing platforms 14 (e.g., web browsers).

In some implementations, the virtual space (and/or the online game) may be accessed through one of a plurality of different social networking platforms provided by one of social network servers 26*a*, 26*b*. The term "social networking platform" is used generally, and the invention is not limited to traditional social networking platforms. Any platform that can provide games or virtual spaces and allows users to interact, e.g., Kabam.com, Steam, Kongregate, and the like, are within the scope of the invention with respect to "social networking platforms." In such implementations, accessing the virtual space through a given social networking platform may include logging into the virtual space through the given social networking platform, receiving a view of the virtual space within a user interface associated with the given social networking platform (e.g., within a web page hosted by the given social networking platform), and/or other mechanisms for accessing the virtual space from the given social networking platform.

The users may participate in the virtual space (and/or the online game that takes place therein) by inputting input commands to their respective client computing platforms 14 that request an action to be taken within the instance of the virtual space (e.g., manipulate an object, control a character, speak to another character, and/or other actions). The input commands may be transmitted from client computing platforms 14 to server 12, and received by space module 16. Responsive to reception of the input commands, space module 16 may initiate the requested actions in the instance of the virtual space such that the actions are reflected in the views of the virtual space determined by space module 16.

A virtual space may comprise a simulated space that is accessible by users via clients (e.g., client computing platforms 14) that present the views of the virtual space to a user. The simulated space may have a simulated physical layout, express ongoing real-time interaction by one or more users, and/or be constrained by simulated physics that governs interactions between virtual objects in the simulated space. In some instances, the simulated physical layout may be a 2-dimensional layout. In other instances, the simulated physical layout may be a 3-dimensional layout or a 3-dimensional-like but not fully 3-dimensional (i.e., "2.5D") layout. An instance of a virtual space may be persistent. That is, the instance of the virtual space may continue to exist whether or not any given user (or set of users) is currently logged in and/or receiving view information.

The above description of virtual spaces is not intended to be limiting. Space module 16 may be configured to express the virtual space in a more limited, or more rich, manner. For example, views of the virtual space presented to the users may be selected from a limited set of graphics depicting an event in a given place within the virtual space. The views may include additional content (e.g., text, audio, pre-stored video content, movable icons, avatars, and/or other content) that describes particulars of the current state of the space, beyond the relatively generic graphics. For example, a view of the virtual space may depict a given location in a relatively static manner that may or may not include representations of the characters present at the location. Text may be used to express the actions of the characters present at the location (and/or effects of the actions), and/or actions of the characters (and/or effects) may be represented with a relatively limited set of still images and/or short animations. For example, a battle, a meeting, a game, and/or other activities at the given location may be depicted in this manner. Other expressions of individual places within the virtual space are contemplated.

Within the instance of the virtual space (or other virtual environment) executed by space module 16, users may control characters to interact with the virtual space and/or each other. As used herein, the term "character" may refer to an object (or group of objects) present in the virtual space that represents an individual user. The character may be controlled by the user with which it is associated. The characters may move through and interact with the virtual space (e.g., non-player characters in the virtual space, other objects in the virtual space), or the characters may be relatively static visually within views of virtual space. The character representing a given user may be created and/or customized by the given user. The character may have an "inventory" of virtual goods and/or currency that the user can use (e.g., by manipulation of a character or other user controlled element, and/or other items), display, gift, and/or otherwise interact with within the virtual space.

User account module 18 may be configured to manage user accounts associated with individual users. The user accounts may include information stored by server 12, one or more of the client computing platforms 14, and/or other storage locations. The user accounts may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users. In some embodiments, user account module 18 may store global user identifiers, network abstraction identifiers, and game user identifiers.

The information included in the user accounts may include character information. For a given user, the user account may include character information for one or more characters that are associated with the user in the virtual space. The one or more characters may be persistent within the virtual space. The one or more characters may be controllable by the given user in the virtual space. Controlling the one or more characters may enable the given user to advance within the online game (e.g., as the characters progress through the game content available in the virtual space). The given user may be able to control a plurality of the characters within the virtual space simultaneously. The given user may only be able to play one of the characters in the online game in the virtual space at a time. Individual ones of the one or more characters may be unique within the virtual space (e.g., have a unique appearance, a unique name, a unique score or inventory, and/or be unique in other ways). The character(s) for which character information is saved in the user profile of the given user may be exclusive to the given user. That is, the given user may be the only user that controls those character(s). The character information included in the user account for a given character may include one or more of a progress level, a status, a score, an inventory, and/or other information.

The information included in the user accounts may include social network authentication information. Social authentication information for a given user may include authentication information used to log into a social networking platform (e.g., username, password, and/or other authentication information), an identifier or other authentication information assigned to the given user by a social networking platform (e.g., without disclosing the authentication information to the given user), an authentication token or key, and/or other authentication information. User account module 18 may be configured such that an individual user may have a user account that includes social network authentication information from a plurality of different social networking platforms. This may enable the user to log into the virtual space (and/or the online game) from any one of the plurality of different social networking platforms. This may enhance accessibility to the virtual space (and/or the online game) for the user, in contrast to conventional systems in which a user logging into an online game can only do so from an individual social networking platform.

Authentication module 20 may be configured to authenticate users to the virtual space (and/or the online game therein). Authenticating users to the virtual space may include receiving authentication requests, determining whether individual ones of the authentication requests are valid, and logging users into the virtual space (and/or the online game) that have submitted valid authentication requests. A valid authentication request may be an authentication request that includes authentication that is valid for one of the users. Determining whether a given authentication request is valid may include referencing one or more user accounts to determine if authentication information in the given authentication request matches authentication information stored in a user account.

In implementations in which users access the virtual space (and/or the online game therein) through the social networking platforms provided by social network servers 26*a*, 26*b*, authentication module 20 may be configured to receive authentication requests that are submitted by users through social network servers 26*a*, 26*b*. These authentication requests may include social network authentication information. By way of example, a social networking platform may include a user interface element that is selectable by a user to initiate access to the virtual space (and/or the online game). Responsive to selection of the user interface element on the social networking platform, an authentication request may be transmitted to server 12. Authentication module 20 may be configured to receive the authentication request and to determine whether it is a valid authentication request (e.g., corresponds to a current user of system 10). Responsive to the received authentication request being valid, access to the virtual space (and/or the online game) may be provided to the user. This may include providing views of the virtual space to the user as described herein, and/or facilitating user participation in the online game by controlling one or more characters associated with the user (e.g., one or more characters for which character information is saved in the user account of the user).

Authentication module 20 may be configured such that for an individual user, access may be provided responsive requests from a plurality of different social networking platforms. For example, when provided authentication information for the plurality of different social networking platforms are included in the user account for the individual user, authentication module 20 may be configured to receive an authentication request from any of the plurality of different social networking platforms and log the individual user into the virtual space through the same user account. For example, progress made in the game during a session initiated through a first social networking platform may still be reflected in the user account during a subsequent session initiated through a second social networking platform.

In some implementations, persistence of the game state and discerning business intelligence may be accomplished by federation module 24, user account module 18, and business intelligence module 27 using information in the user's account. Specifically, federation module 24 and user account module 18 may use a global user identifier, network abstraction identifiers and game identifiers to unite a user's account across social networking platforms.

Figure 2:
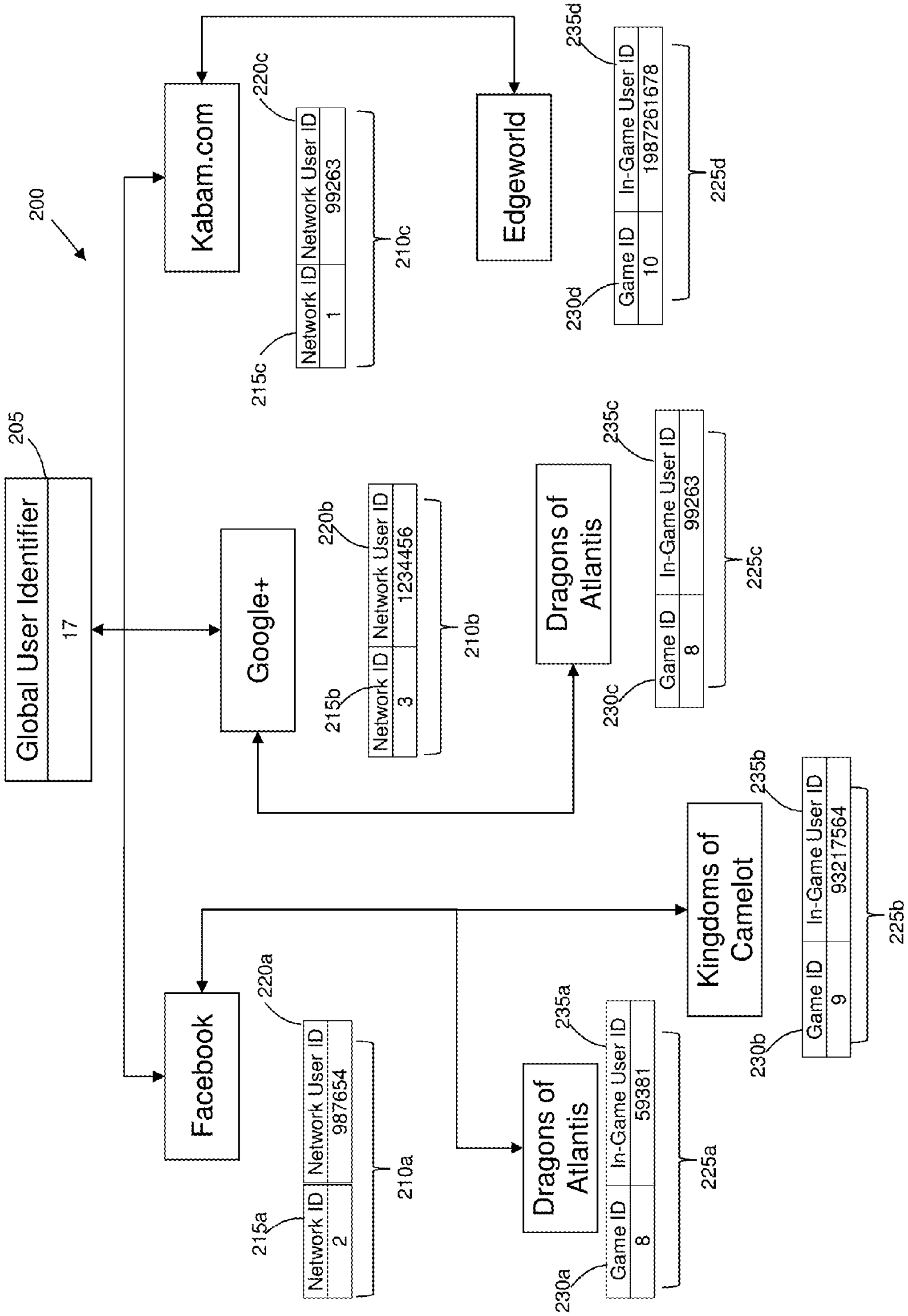
FIG. 2 depicts one implementation of the global user identifier, network abstraction identifiers and game identifiers.

FIG. 2 depicts one implementation 200 of global user identifier, network abstraction identifiers and game identifiers. Global user identifier 205 may be a piece of data that represents a particular user across multiple social networking platforms and across multiple online games. A particular user's global identifier, e.g., "17," typically is the same regardless if that user is logged via social network server 26*a*, e.g., Facebook, or via social network server 26*b*, e.g., Google+.

A network abstraction identifier 210*a*, 210*b*, 210*c* (generally 210) represents the particular user's existence within a particular social networking platform, irrespective of the games the user plays through that social networking platform. A user's account typically has a network abstraction identifier for each social network that they use to play a game, e.g., a first network abstraction identifier 210*a* for Facebook and a second network abstraction identifier 201*b* for Google+ and so on. Network abstraction identifiers often have two components, a network identifier 215*a*, 215*b*, 215*c* (generally 215) that reflects the specific social networking platform and a network user identifier 220*a*, 220*b*, 220*c* (generally 220) that represents the user within that social networking platform. As examples, network identifier 215*a* "2" may be used to represent Facebook, and network identifier 215*b* "3" may be used to represent Google+, and so on. For the network user identifier, the user may be represented as network user ID "987654" when he is using the Facebook social networking platform and he is represented as network user id "1234456" when he is using Google+. This pairing of network identifier 215 and network user identifier 220 creates a unique pair 210 that together identifies a particular user for a given social networking platform. When paired with a global user identifier 205, this provides a way to unite a particular user over several social networking platforms.

There is also a game user identifier 225*a*, 225*b*, 225*c*, 225*d* (generally 225) configured to represent the user's activity within a given online game. Similar to the network abstraction identifier 210, a game user identifier 225 is typically composed of two values: a game identifier 230 that represents the online game and an in-game user identifier 235 that represents the user within that game when playing the game through a given social network. Typically, the game identifier 230 is the same for all instances of the game, regardless of which social network the game is accessed through. For example, Dragons of Atlantis may have a game identifier of "8" (e.g., 230*a*, 230*c*) regardless if the game is played through Facebook, Google+, or other social networking platforms. The in-game user identifier, however, is typically different for each login used by the user, i.e., there is a different in-game user identifier for a user logged in through Facebook than for a user (even if it is the same user) logged in through Google+. For example, when a user is playing Dragons of Atlantis through Facebook, the user's in-game user identifier 235*a* may be "59381." When the user is logged in through Google+, however, the user's in-game identifier 235*c* may be "99263."

Although the global user identifier, network abstraction identifier, and game user identifiers and their respective sub components are depicted herein using integers, any data type may be used that allows the system to distinguish between users, social networking platforms, and games. Additionally, in some implementations, data about the game session may be associated with the global user identifier, and a key for a given session may be formed using one or more of the network abstraction identifier, the game identifier, the in-game user identifier, and a session identifier. Alternatively, in other implementations, the global user identifier and network abstraction identifier are associated with data store entries for a user's game session. For example, a given session's data may include a key that includes one or more of: the global user identifier, a network abstraction identifier representing the social networking platform used, the game identifier representing the game played, and the in-game user identifier. Because the global user identifier 205 and network abstraction identifiers 210 allows for a user's accounts to be united across social networking platforms, when these are combined with game user identifiers 225, it provides a way to unite a user's accounts for the same game across social networking platforms.

Referring back to FIG. 1, social network information module 22 may be configured to receive social networking information from social network servers 26*a*, 26*b*. The social network information may include information about the users gleaned by the social networking platforms through their usage. The social network information may include, for example social graph information (indicating friends or links between users in the social networking platforms), usage information (e.g., usage frequency, cumulative use, session length, material viewed, posted, or otherwise interacted with), demographic information, education information, and/or other information.

Social network information module 22 may be configured to aggregate social network information for individual users. This aggregation may include, for a given user, aggregating social network information that has the same or similar type across multiple social networking platforms. As a non-limiting example, social graph information may be combined across multiple social networking platforms to provide a more complete view of the social graph of the given user. This aggregated information may be implemented in providing the virtual space and/or the online game to the user. For example, the aggregated information may be implemented to suggest alliances or other relationships within the virtual space, form groups of characters to participate in the online game together, assess user value or potential user value, and/or customize other aspects of the virtual space (and/or the online game). By using aggregated information from a plurality of different social networking platforms for an individual user, system 10 may provide enhanced customization over systems that only use information from a single social networking platform.

Federation module 24 may be configured to use the global user identifier, the network abstraction identifiers, and the game user identifiers in the user's account to identify that a given user that has played an online game via one social networking platform is the same user that has played the game via another social networking platform. This may include, responsive to a request by the user to play the online game via a social networking platform such as Google+ 26*b*, identifying the user as having played the same game via Facebook 26*a*. In some implementations, this is accomplished by the federation module 24 determining if the user has a game user identifier 225 in his user account under a network abstraction identifier 210 that is different than the current network abstraction identifier. For example, when a user (global user identifier "17") uses Google+ (Network ID "3", network user ID "1234456") to play Dragons of Atlantis (game ID "8", in-game user identifier "99263"), the federation module 24 determines if the user has any other network abstraction identifiers in his user account, e.g., the user has a Dragons of Atlantis game user identifier (game ID "8", in-game user identifier "59381") associated with his Facebook account (network ID "2", network user ID "987654"). Federation module 24 may then associate the two accounts in the user account, and space module 22 may determine which account of the two is the most current and provide the user with a virtual space that reflects the most up-to-date versions of the user's game account, accomplishments, characters, and the like. As stated above, in some embodiments, user account module 18 may store global user identifier 205, network abstraction identifier 210, and game user identifiers 225. In other embodiments, federation module 24 stores these identifiers 205, 210, 225. In still other embodiments, user account module 18 and federation module 24 each store some or all of the identifiers 205, 210, 225, and the other of the two modules, or other modules, 16, 20, 22, 25, and/or 27 stores the remaining identifiers.

In some implementations, the federation module 24 may unite user accounts upon the user registering with a specific social networking platform. In some embodiments, the game provider provides the game via multiple social networking platforms, e.g., Facebook, Google+, and also provides the game through its own social networking platform, e.g., Kabam.com. When the user requests to play an online game via a first social networking platform, the space module may assign the user a game user identifier. Space module 16 then may make a request to federation module 24 and/or user account module 18 to receive a network abstraction identifier for the user for that social networking platform. In some embodiments, the request for a network abstraction identifier may include the game identifier, the user's identifier for that social networking platform, e.g., network user identifier 220, username, or social networking platform identifier such as a Facebook user id. The federation module 24 and/or user account module 18 may then determine which social networking platform the game is being accessed from. If the game is accessed via the game provider's social network, federation module 24 may create a global user identifier 205 and the user's previous accounts may be united using the global user identifier. If, however, the game is being accessed via a social networking platform that is not the social networking platform of the game provider, then the global user identifier 205 may not be created. In either scenario—the game is accessed via the online game provider's social networking platform or another social networking platform—the game may then be provided to the user. In these embodiments, the global identifier may therefore not be created until the user accesses the game via the game provider's social networking platform.

In some implementations, uniting user accounts obviates having separate virtual spaces for each social networking platform and users from all social networking platforms may interact together. In some implementations though, the virtual spaces associated with each social networking platform are maintained as separate virtual spaces and uniting accounts allows users to migrate their information from one virtual space (for a first social network) to another one (for a different social network). In some cases, the migration may last any length of time, e.g., it may be a permanent migration or the migration may last only as long as a user's session (until the user logs in again from a different social networking platform).

Notification module 25 may be configured to generate notifications to social networking platforms indicating activity by the users in the online game session. This may include, responsive to a user performing an action in the online game session that triggers a notification, generating notifications of the action to a plurality of social networking platforms on which the user has accounts. The notifications may cause an indication of the action to be displayed on walls (explained below) or similar spaces of the user in the social networking platforms. The notifications may provide indications to users of the social networking platforms that are linked with the user (e.g., through a friend relationship, through a link, and/or other relationships). The notifications may be selectable by the other users to gain access to the virtual space (and/or the online game). Generating the notifications for the individual user to a plurality of social networking platforms may be enabled by the storage by user account module 18 of information related to user accounts of the individual user on the plurality of social networking platforms (e.g., social network authentication information and/or other information).

Business intelligence module 27 may provide business intelligence about the user and his behavior on and between social networking platforms. Using information received from any of the modules described herein and/or the social networking platforms, business intelligence module 27 can determine information for a given user on a given social networking platform according to a metric that can either be predetermined or provided by a user/administrator of system 10. The metric may be hard coded or there may be user interface for a user/administrator to provide it. Examples of these metrics include but are expressly not limited to: revenue generated as a result of the user's activity through that social networking platform, time the user is logged into that social networking platform, time the user spent playing the game via that social networking platform, virtual currency bought or spent by the user via that social networking platform, success rate of an ad campaign on the social network, average revenue per user, lifetime value, average number of games played and/or number of contacts the user has on that social networking platform. Business intelligence module 27 can also determine information at an aggregate level, e.g., which social networking platform has users that buy or spend the most virtual currency, on which social networking platform was a particular ad campaign most or least successful, which social networking platform's users generated the most revenue, which social networking platform's users were logged in the longest and/or shortest, which social networking platform's users spent the most and/or least amount of time playing the game, and/or which social networking platform's users have the most and/or least number of contacts. Other metrics related to marketing and revenue generation are within the scope of the invention.

When the user account is united across social networking platforms as described herein, business intelligence module 27 is able to compare the results of the metric analysis described above across social networking platforms for a given user so it can be determined which social networks are more valuable, e.g., of the multiple social networking platforms the user logs in from, on which social networking platform does the user buy or spend the most virtual currency; on which social networking platform did the user respond to a particular ad campaign; of the multiple social networking platforms the user logs in from, which social networking platform generated the most revenue from that user; from which social networking platform was that user logged in the longest and/or shortest; from which social networking platform did that user spend the most and/or least amount of time playing the game; and/or of the multiple social networking platforms the user logs in from, on which social networking platform does user have the most and/or least number of contacts.

Additionally, in some implementations, business intelligence module 27 may also provide business intelligence across games as well. For example, business intelligence module may compare the revenue generated by a user in one game against revenue generated by that user in another game. This may allow game developers, or marketers, or the like to determine which ad campaigns in-game promotions, game mechanics, or other revenue-generating strategies, are effective. Alternatively or additionally, business intelligence module 27 may provide insight as to a user's behavior or attitude towards different games, e.g., as the user starts playing one game, he plays a second game less. Or he plays both equally, or he begins playing the game second game again after playing the first for only a short period of time. These allow the game developer to make determinations about what is incentivizing the player to play the games. In some implementations, business intelligence module 27 provides business intelligence across social networking platforms and across games, e.g., determining that a particular game type, for example, generally resource management games are effective on Facebook, but not on Google+, whereas flash games tend to be more profitable across users on Google+. Any of the metrics described herein can be analyzed across games.

In some implementations, business intelligence module 27 and notification module 25 may be used together to post notifications on the respective social networking platforms to incentivize users' contacts and/or social graph members to play the game. In certain versions, only certain notifications are sent to certain social networking platforms. For example, business intelligence module 27 may determine that a given user is generating more revenue when the user is logging in via Facebook than when the user is logging in via Google+. In that scenario, notification module 25 may then post notifications about the user's progress in the game only to Facebook and not Google+ because Facebook is deemed a more viable target for revenue generation. Additionally or alternatively, business intelligence module 27 may determine that a user has a large number of friends on Google+ that also have accounts for the online game (based on information from the social network information module 22). In that scenario, notification module 25 may post notifications to the user's Google+ feed about the user's activity in the game session. In some cases, only certain notifications are posted to social networking platforms depending on the business intelligence determined by business intelligence module 27. For example, where the user has a large number of friends on Google+, notification module 25 may only post user-competitive-oriented notifications to the user's Google+ account and where the user generates more revenue when he is logged in via Facebook, notification module 25 may only post revenue-generation-oriented notifications to the user's Facebook account. Alternatively, notifications may be posted on a social networking platform where the business intelligence module determines the value for the metric are weak, e.g., if the user has more friends on Google+ than Facebook that play the online game, notification module 25 may post notifications on the user's Facebook account to recruit Facebook members to play the online game. Similarly, if revenue generation is the metric and the user generates more revenue when logged in via Facebook, notification module 25 may post to the user's Google+ account in order to raise the revenue generated by Google+ members.

Social network servers 26*a*, 26*b* may be configured to host a plurality of social networking platforms. Social networking platforms may include online services or and/or sites that focus on building and reflecting social networks or social relations among people. These services and/or sites may enable users to form connections between each other that signify friendships, kinship, romantic relationships, professional relationships, and/or other relationships. These services and/or sites typically enable communication between users, and may provide individual users with "walls". A user's wall in a social networking platform may refer to a set of content that is available for viewing by other users (e.g., users that are linked to the user), and pertains to the user. The content on the user's wall may include content posted by the user, content posted by other users (e.g., users linked to the user), and/or other content. Content from the user's wall may be provided to other users (e.g., in their "feeds") in a broadcast manner.

A given client computing platform 14 may include one or more processors, and electronic display, a control interface, and/or other components. The one or more processors may be configured to execute computer program modules. The computer program modules may be configured to enable or user associated with the given client computing platform 14 to interface with system 10, and/or provide other functionality attributed herein to client computing platforms 14. For example, the computer program modules may include a view module configured to receive view information from server 12 (e.g., generated by space module 16), and to present a view of the virtual game environment (e.g., as described above) based on the received view information. This may facilitate participation by the user of the given client computing platform 14 in the game taking place in the virtual game environment. By way of non-limiting example, the given client computing platform 14 may include one or more of a desktop computer, a laptop computer, a handheld computer, a tablet computing platform, a NetBook, a Smartphone, a gaming console, and/or other computing platforms.

Server 12 may include electronic storage 50, one or more processors 52, and/or other components. Server 12 may include communication lines, or ports to enable the exchange of information with a network and/or other computing platforms. Illustration of server 12 in FIG. 1 is not intended to be limiting. Server 12 may include a plurality of hardware, software, and/or firmware components operating together to provide the functionality attributed herein to server 12. For example, server 12 may be implemented "in the cloud" by a plurality of computing platforms operating together as server 12.

Electronic storage 50 may comprise electronic storage media that electronically stores information. The electronic storage media of electronic storage 50 may include one or both of system storage that is provided integrally (i.e., substantially non-removable) with server 50 and/or removable storage that is removably connectable to server 50 via, for example, a port (e.g., a USB port, a firewire port, etc.) or a drive (e.g., a disk drive, etc.). Electronic storage 50 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 50 may include one or more virtual storage resources (e.g., cloud storage, a virtual private network, and/or other virtual storage resources). Electronic storage 50 may store software algorithms, information determined by processor 52, information received from server 12, information received from client computing platforms 14, and/or other information that enables server 12 to function as described herein.

Processor(s) 52 is configured to provide information processing capabilities in server 12. As such, processor 52 may include one or more of a digital processor, an analog processor, a digital circuit designed to process information, an analog circuit designed to process information, a state machine, and/or other mechanisms for electronically processing information. Although processor 52 is shown in FIG. 1 as a single entity, this is for illustrative purposes only. In some implementations, processor 52 may include a plurality of processing units. These processing units may be physically located within the same device, or processor 52 may represent processing functionality of a plurality of devices operating in coordination. The processor 52 may be configured to execute modules 16, 18, 20, 22, 24, 25, and/or 27. Processor 52 may be configured to execute modules 16, 18, 20, 22, 24, 25, and/or 27 by software; hardware; firmware; some combination of software, hardware, and/or firmware; and/or other mechanisms for configuring processing capabilities on processor 52.

It should be appreciated that although modules 16, 18, 20, 22, 24, 25, and/or 27 are illustrated in FIG. 1 as being co-located within a single processing unit, in implementations in which processor 52 includes multiple processing units, one or more of modules 16, 18, 20, 22, 24, 25, and/or 27 may be located remotely from the other modules. As a non-limiting example, some or all of the functionality attributed to modules 16, 18, 20, 22, 24, 25, and/or 27 may be provided "in the cloud" by a plurality of processors connected through a network. The description of the functionality provided by the different modules 16, 18, 20, 22, 24, 25, and/or 27 herein is for illustrative purposes, and is not intended to be limiting, as any of modules 16, 18, 20, 22, 24, 25, and/or 27 may provide more or less functionality than is described. For example, one or more of modules 16, 18, 20, 22, 24, 25, and/or 27 may be eliminated, and some or all of its functionality may be provided by other ones of modules 16, 18, 20, 22, 24, 25, and/or 27. As another example, processor 52 may be configured to execute one or more additional modules that may perform some or all of the functionality attributed below to one of modules 16, 18, 20, 22, 24, 25, and/or 27. Modules 16, 18, 20, 22, 24, 25, and/or 27 may execute on one server, on multiple distinct servers, there may be a server for each respective module, or the modules may be combined in any number of permutations to execute on any number of servers. Furthermore, server 12 may be a hardware server or it may be a process with a designated memory space executed on a hardware processor.

It will be appreciated that illustration in FIG. 1 and the description herein of modules 18, 20, 22, 24, 25, and/or 27 being provided for implementation with a single online game and/or virtual space (e.g., provided by space module 16) is not intended to be limiting. In some implementations, one or more of modules 18, 20, 22, 24, 25, and/or 27 may provide the functionality described herein for a plurality of separate online games and/or virtual spaces (e.g., provided by a plurality of space modules). Such implementations may reduce redundancy of an entity that provides a plurality of different online games and/or virtual spaces to users through the social networking platforms. In such implementations, the one or more of modules 18, 20, 22, 24, 25, and/or 27 that are provided to serve a plurality of different online games (and/or virtual spaces) may be executed in a separate server from the server(s) executing the space modules.

Figure 3A:
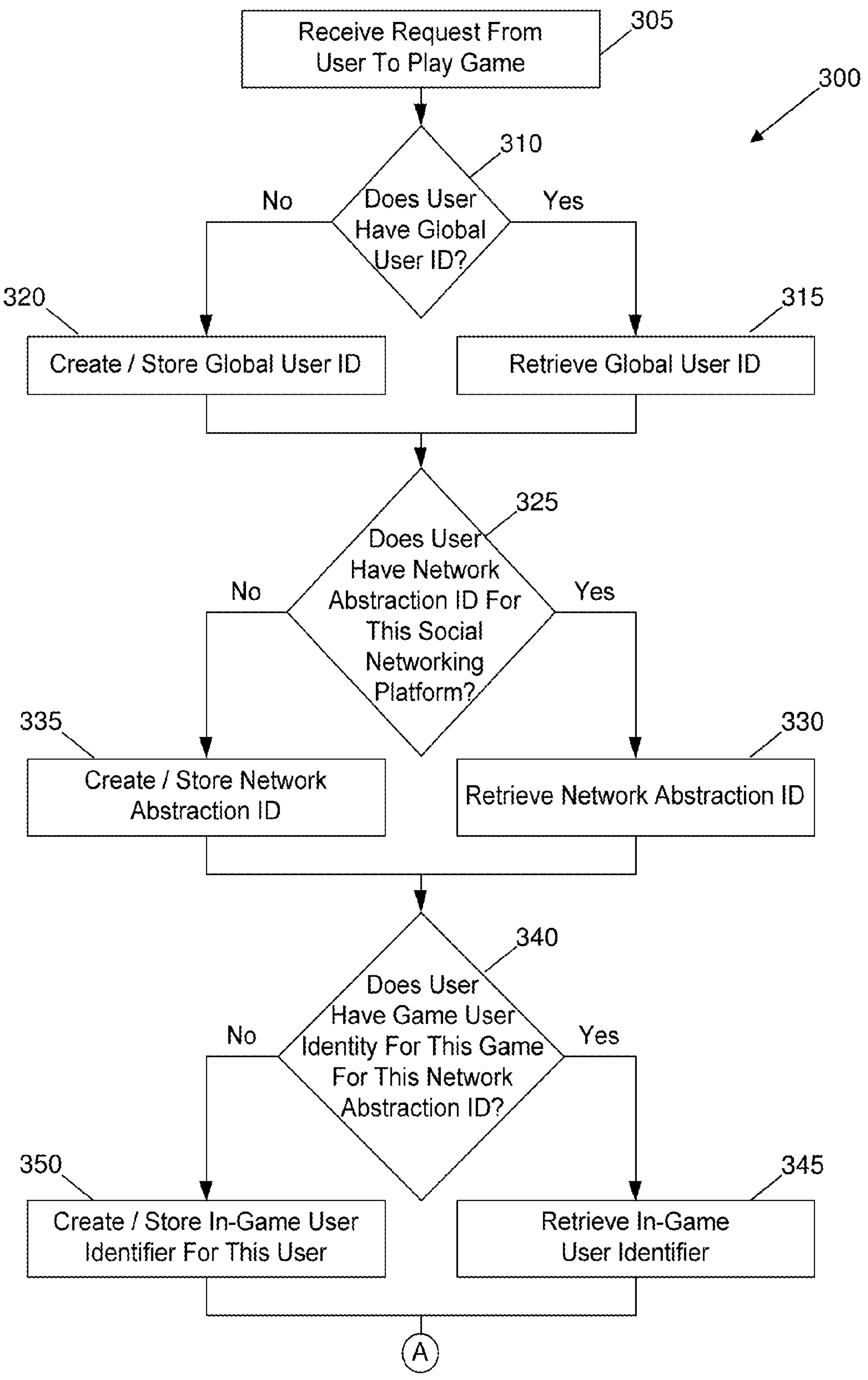
FIGS. 3A and 3B depict a method of uniting user accounts across social networking platforms for an online game.
Figure 3B:
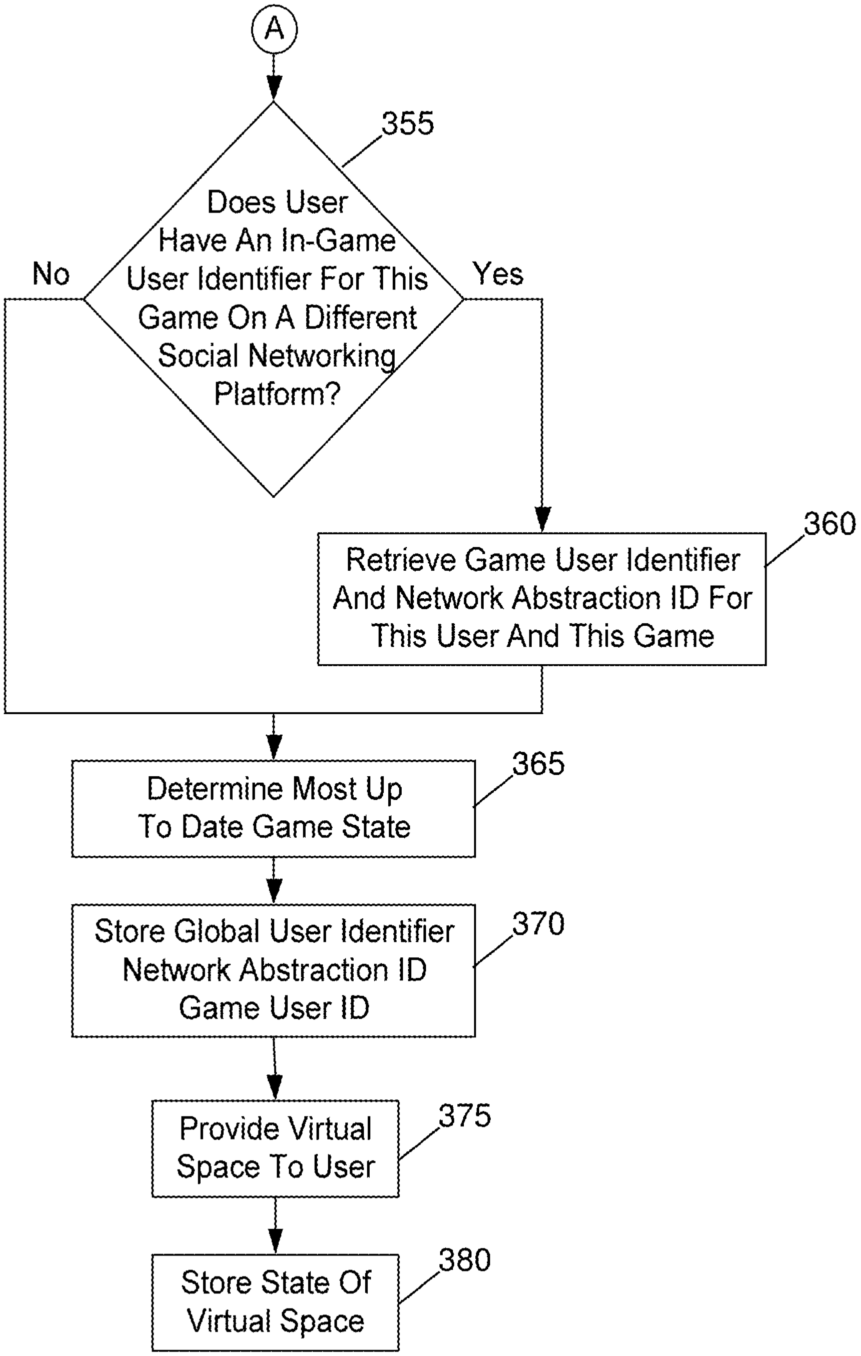

FIGS. 3A and 3B depict a method 300 of uniting user accounts across social networking platforms for an online game. The method 300 begins when a request is received at operation 305 from a user to play the online game via the social networking platform. Operation 305 may be performed by the space module 16. Once the request is received, it may be determined at operation 310 whether or not the user already has a global user identifier 205. If the user does, the global user identifier 205 is retrieved at operation 315. If the user does not, a global user identifier 205 is created and stored at operation 320 for the user in the user's account information.

It may also be determined, at operation 325, whether or not the user has a network abstraction identifier 210 for this social networking platform. If the user does, the network abstraction identifier 210 is retrieved at operation 330 by the federation module 24. If the user does not, a network abstraction identifier 210 for this social networking platform is created and stored at operation 335 in the user's account information.

It may also be determined, at operation 340, whether or not the user already has a game user identifier 225 for this game on this social networking platform. If the user does, the game user identifier 225 is retrieved at operation 345. If the user does not, a game user identifier 225 is created and stored at operation 350 in the user's account information.

It may also be determined at operation 355 whether the user has network abstraction identifiers 210 for other social networking platforms and game user identifiers 225 for the online game played under those social networking platforms. For example, if the user has a game user identifier with game ID "8" under both Facebook and Google+, it can be determined that the user has played the same game (Dragons of Atlantis) under two different social networking platforms and, consequently, using two different in-game user accounts. If the user does have this additional game and social networking platform related information, the network abstraction identifier and the game user identifier are retrieved at operation 360.

In some implementations, each of the determining, retrieving, and/or storing steps above 310, 315, 320, 325, 330, 335, 340, 345, 350, 355, and/or 360 are performed by the federation module 24. In some implementations, the federation module 24 performs the determining steps 310, 325, 340, and/or 355 and the user account module 18 performs the retrieving and/or storing steps 315, 320, 330, 335, 345, 350, and/or 360. And in still other implementations, the user account module 18, the federation module 24, and other modules are coordinated to provide the determining, retrieving, and storing functionality.

The most current version of the virtual space—the most up-to-date games state—and the user's game information may also be determined at operation 365. In some implementations, the space module 16 determines, based on the multiple in-game user identifiers, which virtual space is the most up-to date and/or current. The user's global identifier 205, network abstraction identifiers 210, and game user identifiers 225 may also be stored at operation 370 by the federation module 24 and/or user account module 18 in the user's account information. The virtual space may be provided at operation 375 to the user by the space module 16. As and/or after the user plays the game during the session, the state of the virtual space may be stored at operation 380 by space module 16 for later retrieval.

In some implementations, the virtual space provided to the user is a virtual space solely for users of the social networking platform that the user is currently using, but the user's account information (character's accomplishments, progress, etc.) is the most recent. In other implementations the virtual space provided to the user is shared by users of all social networking platforms. In still other implementations, the user may be presented a virtual space that is a combination of the virtual spaces available to any user of the respective social networks that the user has accessed the game through, e.g., the user may be presented a virtual space that is a combination of the virtual space presented to Facebook user and the virtual space presented to Google+ users.

Figure 4:
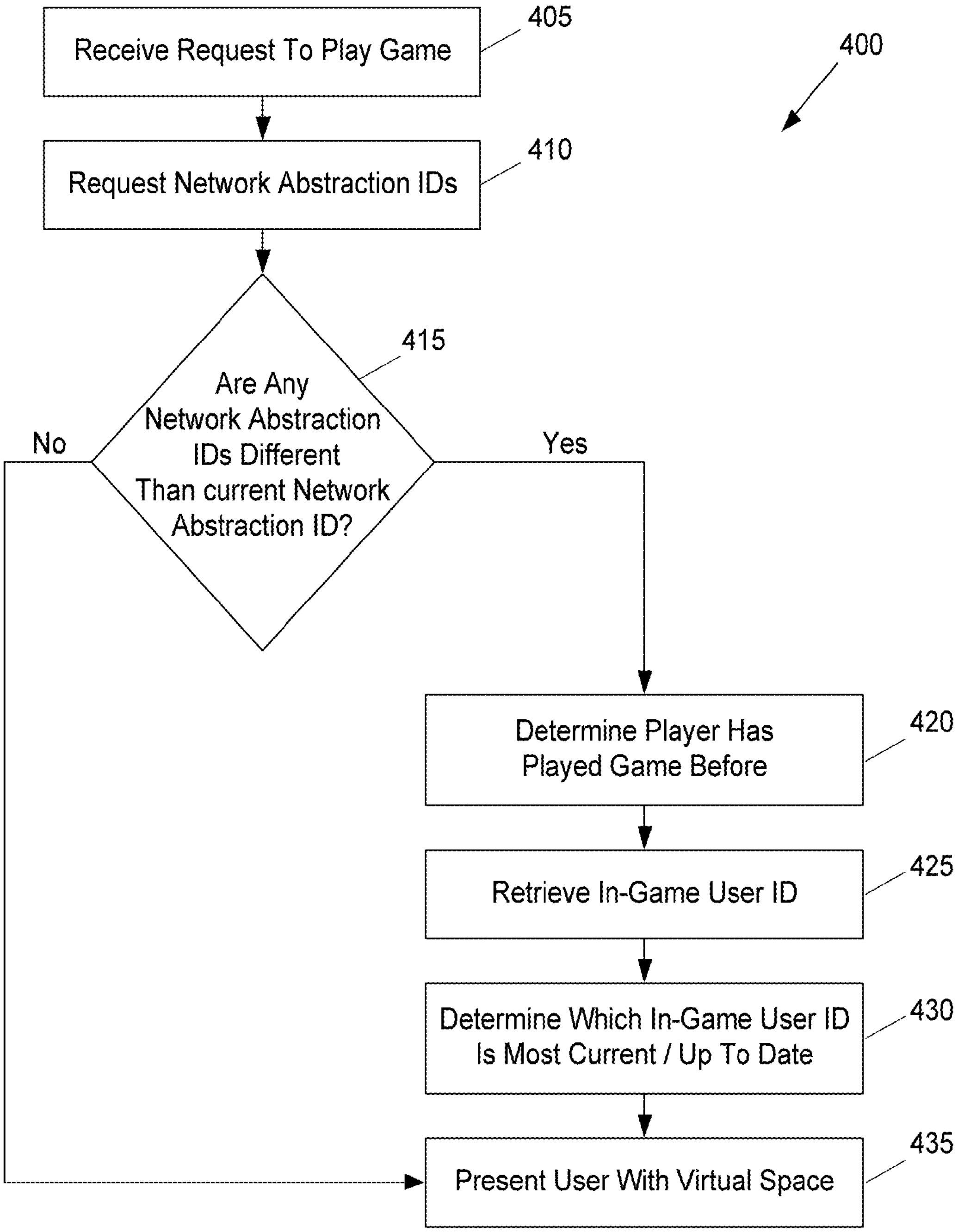
FIG. 4 depicts a method that may be used by a game developer for resolving user accounts across multiple social networking platforms for an online game.

FIG. 4 depicts a method 400 that may be used by a game developer for resolving user accounts across multiple social networking platforms for an online game. The method 400 begins when a request is received at operation 405 via a social networking platform for a user to play the online game.

The online game (via space module 16) may request at operation 410 all network abstraction identifiers 210 for the user associated with the current game via a software development kit (SDK) or platform application programming interface (API) calls. In some implementations, the game passes its user game identifier 225*c* (or in some versions, only the game identifier 230*c*) to the user account module 18 and/or federation module 24 as part of the request. In other implementations, the user account module 18 and/or the federation module 24 may determine the game's game identifier 230*b* because the request is coming from a particular game, whose identifier is known. In some implementations, there may be a lookup table or similar data structure or database of games and game identifiers such that the user account module 18 and/or federation module can look up a particular game's game identifier 230*b* when a request is received from that game. The federation module 24 and/or the user account module 18 return all network abstraction identifiers 210*b*, 210*a* associated with user game identifiers 225*c*, 225*a* that are associated with the same game identifier 230*c*, 230*a*.

Once any already-stored network abstraction identifiers 210*a*, 210*b* are retrieved, the federation module 24 may then determine at operation 415 if there is a network abstraction identifier 210*a* returned that is different from the network abstraction identifier 210*b* for the social networking platform that the user is currently using to play the game. If a network abstraction identifier 210*a* is returned that is different than the current network abstraction identifier 210*b*, the federation module 24 may determine at operation 420 that the user has played the online game via a different social networking platform and may retrieve the in-game user identifier 235*a* for that game at operation 425.

In some implementations, the user game identifiers 225—including the in-game user identifier 235—associated with any of the network abstraction identifiers 210 are returned alongside the network abstraction identifiers 210 at operation 420 instead of being separately retrieved at operation 425.

Upon receiving the additional in-game user identifier 235 information, the space module 16 may then determine at operation 430 which in-game user identifier 235*a*, 235*c* has the most current virtual space and presents the user (at operation 435) with a virtual space reflecting that, regardless of the social networking platform that the user is accessing the game from.

Figure 5:
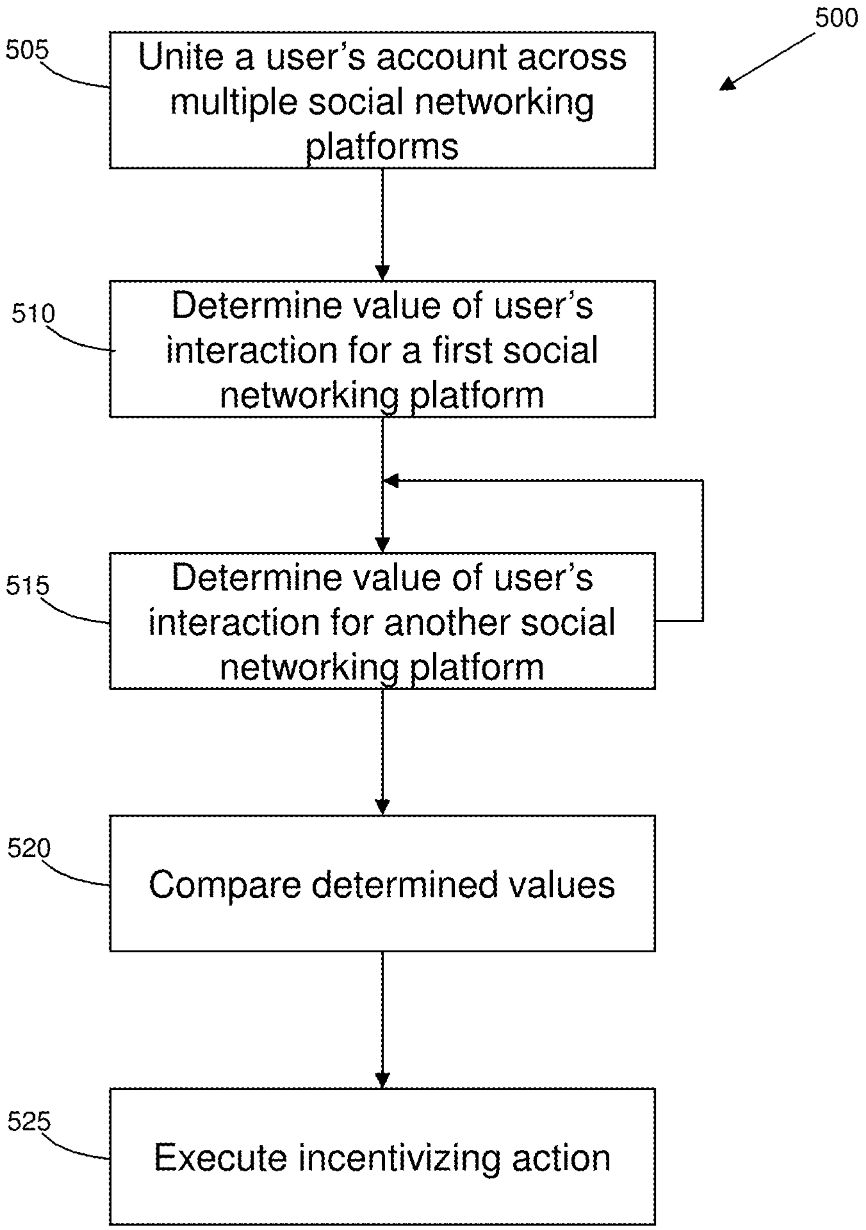
FIG. 5 depicts a method for determining a user's value on different platforms.

FIG. 5 depicts a method 500 for determining a user's value for an online game on different social networking platforms. The method 500 begins by uniting a user's account in an online game across multiple social networking platforms. This can be accomplished as described herein at operation 505. Then the value of the user's interaction within or related to the online game for a given metric may be determined for a first social networking platform at operation 510. As described above, metrics may include, but are not limited to, revenue generated, virtual currency bought or sold, time logged into the game, time logged into the social network, number of friends or associates on the social networking platform, average revenue per user, lifetime value, average number of games played, and the like. The value of the user's interaction within or related to the online game for the same metric may be determined for another social networking platform at operation 515. This process can then be repeated for any number of additional social networking platforms. A comparison of the values for the user's interaction occurs at operation 520. In some implementations, an incentivizing action occurs based on the metric that was used for the comparison at operation 525, e.g., a notification is posted to the user's social networking platform's account.

Figure 6:
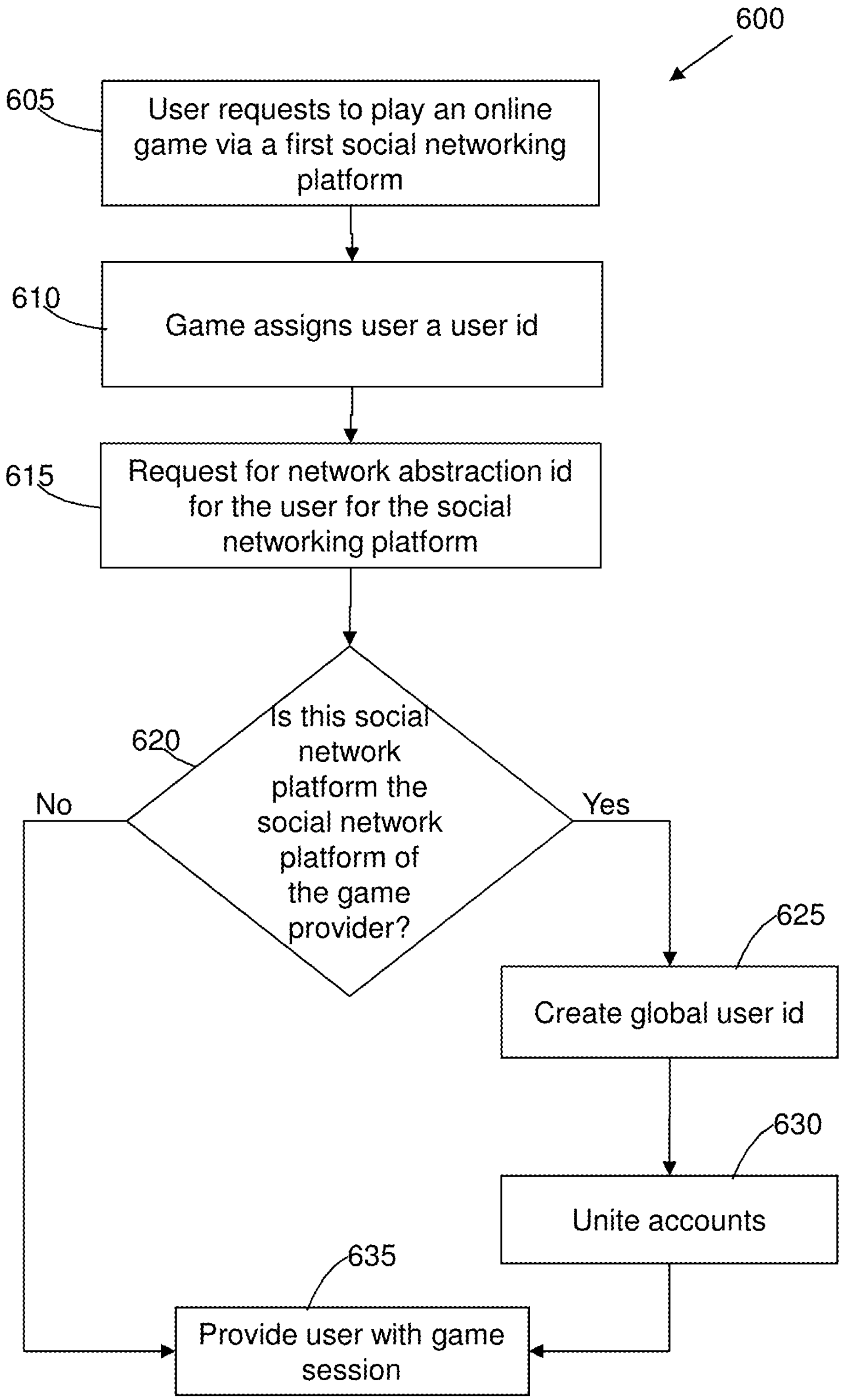
FIG. 6 depicts a method for uniting an account.

FIG. 6 depicts a method 600 of uniting user accounts where uniting a user account occurs upon registration with a specific social networking platform. In some embodiments, the game provider provides the game via multiple social networking platforms, e.g., Facebook, Google+, and also provides the game through its own social networking platform, e.g., Kabam.com. In the method, at operation 605 the user requests to play an online game via a first social networking platform. The online game assigns the user a game user identifier at operation 610. The online game then makes request to the provider of the online game at operation 615 to receive a network abstraction identifier for the user for that social networking platform. In some embodiments, the request for a network abstraction identifier includes the game identifier, the user's identifier for that social networking platform, e.g., username or social networking platform identifier such as a Facebook user id. The provider of the online game then determines at operation 620 which social networking platform the game is being accessed from. If the game is accessed via the game provider's social network, a global user identifier is created at operation 625 and the user's previous accounts are united using the global user identifier at operation 630. If, however, the game is being accessed via a social networking platform that is not the social networking platform of the game provider, then the global user identifier is not created. In either scenario—the game is accessed via the online game provider's social networking platform or another social networking platform—the game session is then provided to the user at operation 635. The global identifier is therefore not created until the user accesses the game via the game provider's social networking platform. This incentivizes the user to register with the online game provider, which benefits the online game provider who, upon the user's registration, now has information about the user they may previously had not.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for uniting a user account across a first online platform and a second online platform for an online game, the system comprising:

one or more physical processors configured by machine-readable instructions to:

manage user accounts associated with individual users, the user accounts including a first user account associated with a first user, wherein the first user account comprises:

a global user identifier configured to represent the first user across the first and second online platforms and in the online game;

a first network abstraction identifier configured to represent the first user within the first online platform, the first network abstraction identifier including at least a network identifier portion that reflects the first online platform and is user agnostic, and a network user identifier portion that represents the first user within the first online platform;

a second network abstraction identifier configured to represent the first user within the second online platform, the second network abstraction identifier including at least a network identifier portion that reflects the second online platform and is user agnostic, and a network user identifier portion that represents the first user within the second online platform, the network user identifier portion of the second network abstraction identifier being different than the network user identifier portion of the first network abstraction identifier; and a first game user identifier configured to represent the first user within the online game, the first game user identifier including at least a game identifier portion that represents the online game and is online platform agnostic, and an in-game user identifier portion that represents the first user within the online game when playing via the first online platform;

identify, responsive to the first user requesting to play the online game via the first online platform, the first user using the global user identifier and the first network abstraction identifier; and identify, responsive to the first user requesting to play the online game via the second online platform, the first user using the global identifier and the second network abstraction identifier as the same user that played the online game via the first online platform but accessing the online game through the second online platform rather than the first online platform, wherein the first online platform and the second online platform are different online platforms and the first user's activity in the online game session played via the first online platform is reflected in the online game session played on the second online platform.

2. The system of claim 1 wherein the one or more physical processors are further configured by machine-readable instructions to instantiate a virtual space of the online game, wherein the state of the virtual space is dependent on the last online game session played by the first user, regardless of whether the online game was played on the first online platform or the second online platform.

3. The system of claim 1 wherein the one or more physical processors are further configured by machine-readable instructions to separately analyze and/or compare the first user's activity within the online game session via the first online platform from the first user's activity within the online game session via the second online platform and assign values to that activity based on a metric.

4. The system of claim 3 wherein the one or more physical processors are further configured by machine-readable instructions to determine, based on the user's activity within the online game session from the first online platform and the second online networking platform, which online platform of the first and second online platforms is more valuable based on metrics comprising one or more of: revenue generated, time the user is logged in via that online platform, time the user spent playing the online game via that online platform, virtual currency bought or spent by the user via that online platform, or number of contacts the user has on that online platform.

5. The system of claim 1, wherein the one or more physical processors are further configured by machine-readable instructions to execute an instance of a virtual space in which the online game is played, such that responsive to the first user being logged into the online game, (i) the instance of the virtual space is implemented to determine view information that defines a view of the virtual space for presentation to the first user, and (ii) the view information is transmitted to a client computing platform associated with the first user to facilitate presentation of the view of the virtual space to the first user on the client computing platform.

6. The system of claim 1, wherein the one or more physical processors are further configured by machine-readable instructions to aggregate information for the individual users that is received from the first and second online platforms such that information about the first user received from the first online platform and the second online platform is aggregated for the first user to represent the first user across both the first online platform and the second online platform.

7. A computer-implemented method of uniting user accounts across a first online platform and a second online platform for an online game, the method being implemented in a computer system comprising one or more physical processors configured by machine-readable instructions, the method comprising:

retrieving a global user identifier configured to represent a first user in response to receiving a request from the first user to play the online game via the first online platform;

storing a game identifier representing the first user's play of the online game via the first online platform, the game user identifier including at least a game identifier portion that represents the online game and is online platform agnostic, and an in-game user identifier portion that represents the first user within the online game when playing via the first online platform;

storing a first network abstraction identifier representing the first user being a member of the first online platform such that responsive to a request by the first user to play the online game via a second online platform, the first user is identified as the same user that played the online game via the first online platform, wherein the first network abstraction identifier includes at least a network identifier portion that reflects the first online platform and is user agnostic, and a network user identifier portion that represents the first user within the first online platform;

storing a second network abstraction identifier representing the first user being a member of a second online platform such that responsive to a request by the first user to play the online game via the second online platform, the first user is identified as the same user that played the online game via the first online platform but accessing the online game through the second online platform rather than the first online platform, wherein the second network abstraction identifier includes at least a network identifier portion that reflects the second online platform and is user agnostic, and a network user identifier portion that represents the first user within the second online platform, the network user identifier portion of the second network abstraction identifier being different than the network user identifier portion of the first network abstraction identifier;

wherein the first online platform and the second online platform are different online platforms and the first user's activity in the online game session played via the first online platform is reflected in the online game session played on the second online platform.

8. The method of claim 7 further comprising instantiating a virtual space of the online game, wherein the state of the virtual space is dependent on the last online game session played by the first user, regardless of whether the online game was played on the first online platform or the second online platform.

9. The method of claim 8, further comprising:

responsive to the first user being logged into the online game, implementing the instantiated virtual space to determine view information that defines a view of the virtual space for presentation to the first user; and transmitting the view information to a client computing platform associated with the first user to facilitate presentation of the view of the virtual space to the first user on the client computing platform.

10. The method of claim 7 further comprising differentiating the first user's activity within the online game session via the first online platform from the first user's activity within the online game session via the second online platform.

11. The method of claim 10 further comprising determining, based on the first user's activity within the online game session via the first online platform and the second online platform, which online platform of the first and second online platforms is more valuable based on metrics comprising one or more of: revenue generated, time the user is logged in via that online platform, time the user spent playing the online game via that online platform, virtual currency bought or spent by the user via that online platform, or number of contacts the user has on that online platform.

* * * * *